United States Patent [19]

Lenke et al.

[11] 4,448,956

[45] May 15, 1984

[54] POLYMERIZATION OF LACTAM WITH GRAFT COPOLYMER PROMOTER

[75] Inventors: Gerd M. Lenke, Mogadore; Earl G. Melby, Uniontown; Hubert J. Fabris, Akron, all of Ohio

[73] Assignee: The General Tire & Rubber Company, Akron, Ohio

[21] Appl. No.: 493,383

[22] Filed: May 10, 1983

[51] Int. Cl.³ .............................................. C08G 69/20
[52] U.S. Cl. ...................................... 528/312; 525/178; 525/183; 525/184; 525/426; 528/315; 528/316; 528/318; 528/323; 528/326
[58] Field of Search ............... 528/323, 312, 318, 326, 528/315; 525/178, 183, 184, 426

[56] References Cited

U.S. PATENT DOCUMENTS

| | | | |
|---|---|---|---|
| 2,303,177 | 11/1942 | Schlack | 260/239 |
| 3,017,391 | 1/1962 | Mottus et al. | 260/78 |
| 3,017,392 | 1/1962 | Butler et al. | 260/78 |
| 3,481,923 | 12/1969 | Naarmann et al. | 528/323 |
| 3,622,535 | 11/1971 | Greenley | 260/37 N |
| 3,887,643 | 6/1975 | Selman | 528/323 |

*Primary Examiner*—Harold D. Anderson

[57] ABSTRACT

Polyamides such as nylon-6 type polyamides are prepared by the reaction or copolymerization of a major amount by weight of a lactam and a minor amount by weight of a graft copolymer of maleic anhydride on a low molecular weight liquid conjugated diene polymer or copolymer or of a copolymer of a conjugated diene and a monovinyl aryl monomer or a nitrile. For example, a graft of maleic anhydride on liquid butadiene/acrylonitrile copolymer is copolymerized with epsilon-caprolactam using an anionic lactam polymerization catalyst (a lactamate salt) like the reaction product of ethyl magnesium bromide and epsilon-caprolactam. The present invention may be useful in a RIM (Reaction Injection Molding) process. The resulting polyamides have improved impact strength and water resistance. They can be used to make automobile and truck bodies and parts.

15 Claims, No Drawings

POLYMERIZATION OF LACTAM WITH GRAFT COPOLYMER PROMOTER

This invention relates to the preparation of polyamides from lactams exhibiting high impact strength and improved resistance to water adsorption.

OBJECTS

An object of this invention is to provide a process for the preparation of polyamides from lactams.

Another object of this invention is to provide polyamides from lactams exhibiting high impact strength and improved resistance to water adsorption.

These and other objects and advantages of the present invention will become more apparent to those skilled in the art from the following detailed description and working examples.

SUMMARY OF THE INVENTION

According to the present invention, it has been found that solid polymers, including polylactam block copolymers, can be prepared by copolymerizing or reacting a major amount by weight of a lactam monomer and a minor amount by weight of an initiator or promoter comprising a polyanhydride graft of a liquid diene polymer in admixture with an effective catalytic amount of anionic lactam polymerization catalyst (lactamate salt). Preferably, there is used 10 to 30% by weight of the initiator and about 90 to 70% by weight of the lactam monomer. The copolymerization is relatively fast and the resulting polyamides, Nylon-6 type polyamides, exhibit improved impact strength and water resistance.

DISCUSSION OF DETAILS AND PREFERRED EMBODIMENTS

The substrate polymer to which maleic anhydride is grafted to form a lactam initiator or promoter is a liquid unsaturated polymer selected from the group consisting of (A) homopolymers, copolymers and mixtures of the same of a polymerizable conjugated diene having from 4 to 6 carbon atoms and (B) copolymers of at least 50% by weight of at least one polymerizable conjugated diene having from 4 to 6 carbon atoms and essentially the balance at least one copolymerizable monomer selected from the group consisting of at least one monovinyl aryl monomer having from 8 to 12 carbon atoms, acrylonitrile and methacrylonitrile and mixtures of (A) and (B).

Examples of the conjugated dienes are butadiene-1,3 (preferred), isoprene, 2,3-dimethyl butadiene-1,3, piperylene and the like. Examples of the monovinyl aryl monomers are styrene, alpha methyl styrene, p-tertiary butyl styrene, para methyl styrene, methyl vinyl toluene, 3-ethyl styrene and the like. Acrylonitrile is a preferred comonomer.

Examples of liquid substrate polymers are polybutadiene, polyisoprene, butadiene-isoprene copolymer, butadiene-styrene copolymer, butadiene-acrylonitrile copolymer, butadiene-styrene-acrylonitrile terpolymer and so forth and mixtures of the same. These liquid polymers have average molecular weights of from about 1,000 to 30,000. While it is preferred to make a liquid polymer directly, one may start with natural rubber, polybutadiene etc. and break down the polymer to form a liquid or semi-solid using peptizers or mastication (milling under nitrogen using a free radical acceptor like thiophenol, thio-beta-naphthol, 1,1'-diphenyl-2-picrylhydrazyl and the like). The polymers may be branched. The copolymers may be random, block or graded block polymers.

These liquid substrate polymers may be made by anionic solution polymerization using as catalysts or initiators lithium, sodium or potassium or their lower alkyl and diene derivatives such as ethyl lithium, propyl lithium, butyl lithium, secondary butyl lithium (preferred), dilithio butadiene, dilithioisoprene (also preferred) and so forth. A sufficient amount of the initiator should be employed to obtain the low molecular weight liquid polymer.

The solution polymerization is conducted in a liquid hydrocarbon solvent. In solution polymerizations it is preferred to operate on a basis of not over about 15 to 30% polymer concentration in the solvent to enable ready heat transfer, mixing and processing. Solvents for the monomers and polymers should not have a very labile carbon-hydrogen bond and should not act at least substantially as chain terminating agents, although some may act as chain transfer agents (to broaden MW distribution). They preferably should be liquid at room temperature (about 25° C.). Examples of such solvents are benzene (less desirable), toluene, the xylenes, the trimethyl benzenes, hemimellitene, pseudocumene, mesitylene, prehnitene, isodurene, o, m, and p cymenes, ethylbenzene, n-propylbenzene, cumene, 1,2,4- or 1,3,5-triethylbenzene, n-butyl benzene and other lower alkyl substituted benzenes, hexane, heptane, octane, nonane, cyclohexane, cycloheptane, cyclooctane and the like and mixtures of the same. The saturated aliphatic and cycloaliphatic solvents and mixtures thereof are preferred.

Small amounts of ethers and tertiary amines may be added to the solution polymerization media to alter the microstructure of the polymer or to effect randomizing and to avoid the formation of block or graded block copolymers. Random copolymers are preferred. Randomizing, also may be obtained by adding the monomers to the reactor in certain ratios or at different times, e.g., by programming. Nevertheless, since the polymer in solution in the polymerization media is a living polymer or since the polymerization is a non-terminating polymerization (unless positively terminated by failure to add monomers or by adding a terminating agent such as methanol), if desired, block copolymers can be prepared.

Temperatures during solution polymerization can vary from about 0° to 150° C. Preferably, polymerization temperatures are from about 30° to 100° C. Time for polymerization will be dependent on the temperature, amount of catalyst, type of polymers desired and so forth.

At the end of the solution polymerization, water, methanol or ethanol and so forth is added to the polymerization media to terminate the polymerization and to inactivate the polymer or to remove the Li atoms etc. from the polymer and to replace them with hydrogen. The solution then may be treated to remove, for example, LiOH or LiOR which might interfer with subsequent grafting and/or formation of the polylactam. For example, the LiOH or LiOR could react with the anhydride to open the ring requiring more anhydride for grafting.

The solvent used in the preparation of the liquid diene based polymer does not need to be used during grafting, but it can be present to facilitate heat transfer and mixing. The solvents used during anionic polymerization and graft copolymerization may be the same. However, non-functional ethers and ketones may aid the solubility of the anhydride in grafting. The solvent must be removed or stripped after grafting since its presence during lactam polymerization would cause blowing.

The low molecular weight liquid diene polymers and copolymers, also, may be prepared by free radical aqueous emulsion polymerization using potassium persulfate and chain transfer agents like carbon tetrabromide, iodide or chloride after which the polymers can be treated to remove emulsifier etc. and dried. These polymers, moreover, may be prepared in solution using free radical initiators such as peroxides and azo compounds.

Grafting of maleic anhydride onto the substrate liquid polymer may be effected by using heat alone, for example, a temperature of from about 140°–300° C. for from about 2 to 5 hours. However, lower temperatures may be employed with somewhat shorter times using free radical catalysts, e.g., about 2 to 4 hours at temperatures less than 100° C. Examples of free-radical catalysts are cumene hydroperoxide, dibenzoyl peroxide, diacetyl peroxide, didecanoyl peroxide, di-t-butyl peroxide, dilauroyl peroxide, bis(p-methoxy benzoyl) peroxide, t-butyl peroxy pivalate, dicumyl peroxide, isopropyl percarbonate, di-sec-butyl peroxydicarbonate, azobis-dimethylvaleronitrile, 2,2'-azobisisobutyronitrile, 2,2'-azobis-2-methylbutyronitrile and 2,2'-azobis(methylisobutyrate) and the like and mixtures of the same. Only minor amounts of catalyst are necessary to effect grafting.

Chelating agents, short stops and/or mercaptans may be used during graft copolymerization. Shortstops in free radical polymerization are well known. They are not only used to stop the polymerization in the reactor at the desired conversion but also to prevent further polymerization, cross-linking etc., during stripping, work-up and so forth. Antioxidants may be present during the graft copolymerizations or added to the resulting polymers after anionic polymerization or graft copolymerization. These additives should not interfere with the subsequent lactam polymerization not the resulting polyamide.

The amount of maleic anhydride grafted onto the liquid diene polymer substrate may be from about 4 to 13 parts by weight per 100 parts by weight of the liquid diene polymer substrate. These anhydride graft polymer initiators or promoters should have a Tg (glass transition temperature) of from about −40° to −100° C. Mixtures of these graft copolymers may be used.

Anionic polymerization and liquid polybutadienes are known as shown by the "Encyclopedia Of Polymer Science And Technology," Vol. 2, 1965, John Wiley & Sons, Inc., New York, pages 95–137 and by Luxton, "Rubber Chemistry And Technology," 54(3), 1981 (July–August), pages 596–626. Liquid polydienes obtained by free radical emulsion polymerization are known as shown by "Vinyl And Diene Monomers," High Polymers, Vol. 24, Part 2, Wiley Interscience, John Wiley & Sons, Inc., New York, 1971, page 916. Free Radical aqueous emulsion polymerization of ethylenically unsaturated monomers is further shown by Whitby et al, "Synthetic Rubber," John Wiley & Sons, Inc., New York, 1954; Bovey et al, "Emulsion Polymerization," High Polymers, Vol. IX, Interscience Publishers, Inc., 1955; Schildknecht, "Vinyl and Related Polymers," John Wiley & Sons, Inc., New York, 1952 and "Encyclopedia of Polymer Science and Technology," Vol. 3 (1965), Vol. 5 (1966), Vol. 7 (1967), Vol. 9 (1968) and Vol. 11 (1969), Interscience Publishers, a division of John Wiley & Sons, Inc., New York. Block and graft copolymers are known as shown by the "Encyclopedia Of Polymer Science And Technology," Vol. 2, supra, pages 485–528 and "Encyclopedia Of Polymer Science and Technology," Supplement, Vol. 2, 1977, pages 129–158. For more information on graft polymers or copolymers, please see "Proceedings Of The Third Rubber Technology Congress," 1954, W. Heffer & Sons, Ltd., Cambridge, pages 185–195; "Copolymerization," High Polymers, Vol. XVIII, Ham, Interscience Publishers a division of John Wiley & Sons, New York, 1964; "Block and Graft Polymers," Burlant and Hoffman, Reinhold Publishing Corporation, New York, 1960; "Block and Graft Copolymers," Ceresa, Butterworth & Co. (Publishers) Ltd., London, 1962; Ceresa, "Block and Graft Copolymerization," Vol. 1 (1973) and Vol. 2 (1976), John Wiley & Sons, Ltd., New York and "Graft Copolymers," Polymer Reviews, Vol. 16, Battaerd and Tregear, Interscience Publishers, a division of John Wiley & Sons, New York, 1967. The grafting of maleic anhydride on liquid polybutadienes and butadiene copolymers is shown by Luxton above and U.S. Pat. No. 4,145,321; British Pat. No. 1,507,793 and European Patent Application No. 0,007,190.

Polymerizations, of course, anionic, graft etc. should be conducted in a closed reactor, preferably a pressure reactor, fitted with a stirrer, heating and cooling means, with means to flush with or pump in an inert gas such as nitrogen, neon, argon and so forth in order to polymerize under inert or non-reactive conditions, with means to charge monomer, liquid polymer, anhydride, solvent (when used) and catalyst or initiator, and other additives, venting means and with means to recover the resulting polymer and so forth.

The lactam monomer, used in the process of the present invention to form the bulk of the polyamide, has the formula

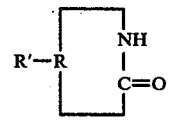

where R is an alkylene radical of from 5 to 11 carbon atoms and R' is hydrogen or an alkyl radical of from 1 to 4 carbon atoms. Mixtures of these lactams can be used. Examples of suitable lactams are epsilon-caprolactam (preferred), enantholactam, caprylolactam, nonanolactam, decanolactam, dodecanolactam, 3-methyl caprolactam, 4-isopropyl caprolactam and the like. These monomers thus have an alkylene chain of from 5 to 15 carbon atoms. It is preferred to use epsilon-caprolactam.

The anionic lactam polymerization catalyst (lactamate salt) is formed by prior reaction of a metal or metal compound with a stoichiometric quantity of or in an excess of the lactam monomer which is then added to the polymerization medium. Examples of metal or metal compounds which can be used include Li, Na, K, Mg, Ca, R"MgBr, R"MgCl or R"MgI (where R" is an alkyl group of 1 to 3 carbon atoms) like ethyl magnesium bromide or other Grignard reagents, sodium phenyl, sodium hydride, n-butyl lithium, alkali metal alkoxides, such as sodium methoxide, and so forth and mixtures thereof. Preferred materials are ethyl magnesium bromide or butyl lithium. The metal or metal compound may be supplied as a dispersion or solution in a suitable dispersant or solvent such as an ether like diethyl ether. The catalyst, thus, has the formula

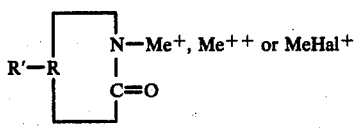

where Me+, Me++ or MeHal+ is a metal or metal halide cation (e.g. MgBr+), respectively, as shown above and R' and R have the significance as defined above. Examples of such catalysts are sodium caprolactam, bromo-magnesium caprolactam (sodium caprolactamate, bromo-magnesium caprolactamate) and the like. Mixtures of catalysts may be used.

The lactam monomer used to form the anionic lactam polymerization catalyst and for the bulk of the polyamide falls within the scope of the above lactam monomer formula, whether being the same or different or mixture thereof.

All of the polyamide reactants should be dry and stripped of solvent and free of dispersant prior to use or before final injection into a mold and polymerization.

During polyamide molding (liquid injection) temperatures for molding may be in the range of from about 80° to 210° C., preferably from about 125° to 195° C. Temperatures, of course, may vary depending on the type of lactam or lactams being employed. During molding, pressures may range from about 0.9 to 100, preferably from about 1 to 50, Kp/cm², and times may range from 1 to 120 minutes.

Methods of making the polyamides of the present invention can vary. The molten lactam, the initiator and the lactamate catalyst can be mixed and charged to a mold. The catalyst can be preformed separately by addition of a metal or metal compound, e.g., a Grignard solution, to molten lactam (preferably an excess of lactam is used as a diluent). The initiator may be charged after the catalyst, but preferably the catalyst is added last.

A convenient method of making the polyamides of the present invention is to utilize a so-called "reaction injection molding" (RIM) technique (D. J. Prepelka and J. L. Wharton, "J. Cellular Plastics," March–April 1975, p. 87). In this case two streams of molten lactam, one containing the catalyst and the other the initiator, are mechanically mixed in a mixing head or chamber and injected into a preheated mold. Modifications of this process, as well as other methods, can be utilized to prepare the polyamide.

Optionally, the polymer compositions of this invention may be reinforced by incorporation of chemically inert particulate fillers, fibrous materials, or a combination of both. Examples of particulate fillers are: milled glass fibers, mica, wollastonite, mullite, silica, quartz and feldspar. Examples of fibrous materials are: chopped glass fibers, woven or non-woven glass fiber mats. Particulate fillers are dispersed in the monomeric melt or one of the reactants. Preformed glass mats can be placed in the empty mold prior to charging. Preferred are the glass fibers such as the milled glass fibers, chopped glass fibers, glass strands or yarns and woven or non-woven glass fiber mats, and they can be used in an amount up to about 35%, preferably up to about 25%, by weight of the polymeric composition. Other additives can be mixed with the monomeric melt or one of the reactants such as pigments, dyes, stabilizers, antioxidants, fire or flame retardants, lubricants, delustering agents and other thermoplastics and rubbers. All of these added materials should be treated or stripped to remove moisture, solvents and so forth which might adversely affect the polymerization reaction or the resulting polyamide.

The polyamides produced by the method of the present invention may be used in the manufacture of gears, wheels, foams, bushings, couplings, parts of casings, fan rotors, links for conveyor chains, fibers, furniture parts, automobile and truck bodies and parts and wherever high impact strength dimensionally stable polyamide products are desired. The process of the present invention may be particularly useful in a RIM (Reaction Injection Molding) process.

The following examples will serve to illustrate the present invention with more particularly to those skilled in the art. Parts are parts by weight unless otherwise noted.

EXAMPLE 1

30 g of liquid polybutadiene (non-functional poly-Bd prepared by solution polymerization using an organolithium initiator; Brookfield viscosity of 120 cps; $\overline{M}w$ about 6500) were dried at 90°–130° C. for 1 hour under vacuum. The vacuum was broken with dry $N_2$, and 2 g commercial grade maleic anhydride (20 mmoles) and VAZO 64 (DuPont, azo-bis (isobutyronitrile)) (ca. 0.3–0.4 g) as catalyst were added at 90° C. After 3 hours at 80°–90° C. under nitrogen, the viscosity of the liquid was almost too high for stirring. The reaction product, graft copolymer, was degassed under vacuum. There was no indication from TLC of unreacted maleic anhydride at the end of the copolymerization.

Separately, 155 g of a dry epsilon-caprolactam melt was prepared containing 45 mmoles of a MgBr.caprolactam salt (prepared from ethyl magnesium bromide in diethylether and epsilon-caprolactam which had been stripped of volatiles). This melt was mixed with the maleinated poly-Bd at ca. 85° C. Mixing was extremely difficult. Some of the graft did not dissolve in the caprolactam melt due to premature gelation from the mixing problems. Still, most of the liquid mix was transferred into a preheated (100° C.) sheet mold and polymerized at 150° C. under nitrogen.

The resulting polyamide product had a hardness of 82–84 Shore D, and a Gardner impact resistance of 10–12 inch lbs. at a thickness of ⅛ inch and >80 inch lbs. at 1.75 inch thickness. Its resistance to water absorption was excellent; for example, there were not any changes in length and width of a dry test sample after exposure to 50% relative humidity for 2 weeks and an average of only 0.5% linear increase after immersion in water for 1 week.

EXAMPLE 2

A mixture of 30 g HYCAR 1312 (B. G. Goodrich Co.; liquid butadiene-acrylonitrile copolymer; sp. gr. 0.98; 33 wt. % AN), 2 ml dry xylene, ca. 0.2 g POLYGARD HR [tri(mixed mono/di-nonylphenyl) phosphite, Uniroyal Chemical] and 2 g maleic anhydride (ca. 20 mmoles) was heated to 160°–170° C. for 1.5 hours and 190°–200° C. for 3 hours under nitrogen. Vacuum was applied at 75° C. to remove volatiles (no free maleic anhydride was detected by TLC).

A melt of 170 g predried epsilon-caprolactam, containing 45 mmoles of MgBr.epsilon-caprolactam lactamate catalyst, was combined with the maleinated liquid butadiene-acrylonitrile copolymer at ca. 80° C. under nitrogen. The nitrile graft dissolved well in the molten lactam. Polymerization was accomplished in a sheet mold at 150° C. under nitrogen. Although the mold was left in the oven for 30 minutes, indications were that the polymerization was virtually over in less than 5 minutes.

Surface hardness of the resulting polyamide was 85–87 Shore D. Gardner impact was ca. 10 inch lbs. at $\frac{1}{8}$ inch thickness and >40 inch lbs. at $\frac{1}{4}$ inch thickness. The water resistance of this polyamide was less than that of the polyamide product of Example 1. However, there was not any solubility or compatibility problems in preparing the polyamide of this Example.

EXAMPLE 3

In this example, a liquid Bd/AN copolymer with only 15 wt. % AN was used. However, since this polymer had terminal hydroxyl groups, these groups had to be capped with a monoisocyanate in order to prevent their reaction with maleic anhydride. Sinclair, now ARCO Chemical, poly-Bd/CN-15 was used. It was a liquid butadiene-acrylonitrile copolymer; 15 wt. % AN; $\overline{M}w$ about 3600 (VPO); 0.6 meq. OH/g and 2.2 OH groups average molecule.

To 30 g poly-Bd/CN-15 were added 10 ml of mixed xylenes for viscosity reduction and to azeotrope out water. Ca. 6 ml thereof were stripped off at 150°–155° C. After cooling to 100° C., under dry $N_2$, 2.65 g of tolylisocyanate (ca. 20 meq NOO, Eastman) and 1 drop of stannous octoate were added. After ca. 30 minutes at 115°–125° C., an IR scan indicated complete reaction of the isocyanate and hydroxyl groups.

2 g of maleic anhydride (20 mmoles) were added to the Bd-AN copolymer under $N_2$ at 140° C., and the temperature was raised to 160° C. After 2 hours, the very viscous reaction product was degassed under vacuum to remove volatiles, mainly xylenes. No unreacted MAH was detected.

170 g of a predried epsilon-caprolactam melt containing 45 mmoles of MgBr.epsilon-caprolactam salt were combined with the maleinated nitrile copolymer at ca. 85° C. under $N_2$. Upon mixing, some of the liquid gelled around the stirred. Still a portion of the molten materials could be poured into a hot sheet mold and cured as described before at 150° C.

The smooth polyamide sheet obtained had a surface hardness of 87–88 Shore D and a Gardner impact strength of up to 160 inch lbs.

EXAMPLE 4

In this Example, 15 wt. % of a monol-2000 was incorporated into a polycaprolactam structure using a styrene/maleic anhydride copolymer as initiator. The monol was a copolymer of propylene oxide and allyl glycidyl ether (wt. ratio ca. 92:8) initiated by isopropanol/$Zn_3$.[Co(CN)$_6$]$_2$. The $\overline{M}w$ of the monol was ≈2,000 with 0.49 meq. OH/g.

To a predried melt of 100 g epsilon-caprolactam and 30 g of the monol-2000 were added 15 ml of a 3 molar Grignard solution in diethyl ether [containing 45 mmoles Mg($C_2H_5$)Br] and stripped with $N_2$ to remove volatiles.

7 g of a styrene/maleic anhydride copolymer (SMA-1000A; melting range 150°–170° C.; ARCO Chemical; St/MAH≈1:1; $\overline{M}n$≈1,600; 6.9 anhydride groups/average molecule) were combined with 65 g of molten, predried epsilon-caprolactam under $N_2$.

The two melts were mixed under $N_2$ at ca. 80° C. and a preheated mold (125° C.) was filled with the mixture. No gelation occurred prior to mold filling. Polymerization was allowed to proceed in an oven at 135°–150° C. for ca. 50 minutes.

The resulting polyamide sheet ($\frac{1}{8}$ inch thick) was well polymerized, macroscopically homogeneous, light beige and translucent.

The properties of the polyamide obtained were as follows:

| | |
|---|---|
| Hardness (Shore D) | 82–84 |
| Gardner Impact (inch lbs.) | >160 |
| Notched Izod (ft.lbs./inch) at 50% relative humidity | 21 |
| Flexural Strength (psi) | 11.9 × 10$^3$ |
| Flexural Modulus (psi) | 3.05 × 10$^5$ |

Linear expansion of this polyamide due to water absorption from dryness was 0.6% at 50% relative humidity and 3.1% after immersion in water for 3 weeks. This was a rather high water absorption and may be due to the relative high concentration of hydrophilic carboxylate salts.

Furthermore, a polyamide made from the reaction of (1) epsilon-caprolactam and (2) a small amount of an initiator from the reaction of hydrogenated diphenyl methane diisocyanate and an excess of epsilon-caprolactam in admixture with a small amount of Grignard catalyst solution (EtMgBr in EtOEt and epsilon-caprolactam, ca. 10:100) gave a Gardner Impact of <4 inch-/pounds, notched Izod impact of 0.7–1 ft.lb./inch notch at 50% relative humidity, elongation at break of 3–5% and moisture absorption of 6 wt. % in 3 days.

Notes for the Examples:

| | |
|---|---|
| Poly-Bd | Polybutadiene |
| $\overline{M}w$ | Weight average molecular weight |
| Ca. or ca. | About |
| TLC | Thin-layer chromatography |
| AN | Acrylonitrile |
| Bd/AN or Bd-AN | Butadiene-acrylontrile copolymer |
| VPO | Vapor pressure osmometry |
| $N_2$ | Nitrogen |
| NCO | Isocyanate |
| IR | Infrared |
| MAA | Maleic anhydride |
| $\overline{M}n$ | Number average molecular weight |
| St/MAH | Styrene/maleic anhydride copolymer |

We claim:

1. The method which comprises mixing together and copolymerizing to form a solid polyamide
    (a) a major amount of weight of the mixture of at least one lactam monomer and
    (b) a minor amount by weight of the mixture of at least one graft copolymer promoter having a Tg of from about −40° to −100° C. and comprising (I) from about 4 to 13 parts by weight of maleic anhydride grafted on (II) 100 parts by weight of at least one liquid polymer having an average molecular weight of from about 1,000 to 30,000 and being selected from the group consisting of (A) homopolymers, copolymers and mixtures of the same of polymerizable conjugated dienes having from 4 to 6 carbon atoms and (B) copolymers of at least 50% by weight of at least one polymerizable conjugated diene having from 4 to 6 carbon atoms and essentially the balance at least one copolymerizable monomer selected from the group consisting of at least one monovinyl aryl monomer having from 8 to 12 carbon atoms, acrylonitrile and methacrylonitrile and mixtures of the same in admixture with (c) an effective catalytic amount of an anionic lactam polymerization catalyst (lactamate salt), the lactam of (a) and (c) having the formula

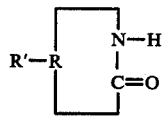

where R is an alkylene radical of from 5 to 11 carbon atoms and R' is hydrogen or an alkyl radical of from 1 to 4 carbon atoms.

2. The method according to claim 1 where said lactam monomer is used in an amount of from about 90 to 70% by weight and where said graft copolymer is used in an amount of from 10 to 30% by weight.

3. The method according to claim 2 where the lactam monomer is epsilon-caprolactam.

4. The method according to claim 3 where said promoter is a graft of maleic anhydride on polybutadiene-1,3.

5. The method according to claim 3 where said promoter is a graft of maleic anhydride on butadiene-1,3-acrylonitrile copolymer.

6. The solid polyamide produced by the method of claim 1.

7. The solid polyamide produced by the method of claim 2.

8. The solid polyamide produced by the method of claim 3.

9. The solid polyamide produced by the method of claim 4.

10. The solid polyamide produced by the method of claim 5.

11. A solid polyamide copolymer of (a) a major amount by weight of at least one lactam having an alkylene chain of from 5 to 15 carbon atoms between amide groups and (b) a minor amount by weight of at least one graft copolymer having a Tg of from about $-40°$ to $-100°$ C. and comprising (I) from about 4 to 13 parts by weight of maleic anhydride grafted on (II) 100 parts by weight of at least one liquid polymer having an average molecular weight of from about 1,000 to 30,000 and being selected from the group consisting of (A) homopolymers, copolymers and mixtures of the same of polymerizable conjugated dienes having from 4 to 6 carbon atoms and (B) copolymers of at least 50% by weight of at least one polymerizable conjugated diene having from 4 to 6 carbon atoms and essentially the balance being at least one copolymerizable monomer selected from the group consisting of at least one monovinyl aryl monomer having from 8 to 12 carbon atoms, acrylonitrile and methacrylonitrile and mixtures of the same.

12. A solid polyamide according to claim 11 wherein the amount of said lactam is from about 90 to 70% by weight and wherein the amount of said graft copolymer is from 10 to 30% by weight.

13. A solid polyamide according to claim 12 where said lactam is epsilon-caprolactam.

14. A solid polyamide according to claim 13 where said graft copolymer is a graft of maleic anhydride on polybutadiene-1,3.

15. A solid polyamide according to claim 14 where said graft copolymer is a graft of maleic anhydride on butadiene-1,3-acrylonitrile copolymer.

* * * * *

UNITED STATES PATENT AND TRADEMARK OFFICE
CERTIFICATE OF CORRECTION

PATENT NO. : 4,448,956
DATED : May 15, 1984
INVENTOR(S) : Gerd M. Lenke et al

It is certified that error appears in the above-identified patent and that said Letters Patent are hereby corrected as shown below:

Column 10, line 36, "claim 14" should read ---claim 13---.

Signed and Sealed this

Eighteenth Day of September 1984

[SEAL]

Attest:

GERALD J. MOSSINGHOFF

Attesting Officer     Commissioner of Patents and Trademarks